United States Patent
Shetty et al.

(10) Patent No.: US 8,798,088 B1
(45) Date of Patent: Aug. 5, 2014

(54) DYNAMIC MANAGEMENT OF NETWORK-RESOURCE USAGE BASED ON NETWORK LOADING

(75) Inventors: Manoj Shetty, Overland Park, KS (US); Sachin R. Vargantwar, Overland Park, KS (US); Maulik K. Shah, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 791 days.

(21) Appl. No.: 12/690,636

(22) Filed: Jan. 20, 2010

(51) Int. Cl.
| | |
|---|---|
| *H04J 3/16* | (2006.01) |
| *H04W 28/18* | (2009.01) |
| *H04W 72/12* | (2009.01) |
| *H04W 28/02* | (2009.01) |
| *H04W 72/04* | (2009.01) |
| *H04W 74/02* | (2009.01) |
| *H04W 74/04* | (2009.01) |
| *H04W 74/06* | (2009.01) |
| *H04W 76/02* | (2009.01) |

(52) U.S. Cl.
CPC .......... *H04W 28/18* (2013.01); *H04W 28/0231* (2013.01); *H04W 28/0247* (2013.01); *H04W 28/0252* (2013.01); *H04W 72/0406* (2013.01); *H04W 72/0413* (2013.01); *H04W 72/042* (2013.01); *H04W 72/121* (2013.01); *H04W 72/1252* (2013.01); *H04W 72/1257* (2013.01); *H04W 72/1278* (2013.01); *H04W 72/1284* (2013.01); *H04W 72/1289* (2013.01); *H04W 74/02* (2013.01); *H04W 74/04* (2013.01); *H04W 74/06* (2013.01); *H04W 76/02* (2013.01); *H04W 76/021* (2013.01); *H04W 76/027* (2013.01); *H04W 76/028* (2013.01)

USPC ......................................................... 370/437

(58) Field of Classification Search
CPC ............ H04W 28/18; H04W 28/0231; H04W 28/0247; H04W 28/0252; H04W 72/0406; H04W 72/0413; H04W 72/042; H04W 72/121; H04W 72/1252; H04W 72/1257; H04W 72/1278; H04W 72/1284; H04W 72/1289; H04W 74/02; H04W 74/04; H04W 74/06; H04W 76/02; H04W 76/021; H04W 76/027; H04W 76/028
USPC .................. 370/329, 331, 437, 441–3, 458–9
See application file for complete search history.

(56) References Cited

U.S. PATENT DOCUMENTS

| | | | | |
|---|---|---|---|---|
| 2005/0044211 | A1* | 2/2005 | Adhikari ....................... | 709/224 |
| 2006/0234707 | A1* | 10/2006 | Byun et al. .................... | 455/436 |
| 2008/0080369 | A1* | 4/2008 | Sumioka et al. .............. | 370/229 |
| 2009/0245157 | A1* | 10/2009 | Song .............................. | 370/312 |
| 2010/0085874 | A1* | 4/2010 | Noy et al. ...................... | 370/230 |

* cited by examiner

*Primary Examiner* — Mark Rinehart
*Assistant Examiner* — Peter Cheng (57) ABSTRACT

Disclosed herein are methods and systems for managing usage of traffic-channel resources in an access network, which are preferably resources that are reserved during a traffic channel assignment (TCA) process. An exemplary method comprises (i) a base station determining a usage level of at least one traffic-channel resource in a coverage area of the access network; (ii) based at least in part on the determined usage level, updating one or more TCA parameters affecting expected usage of the traffic-channel resource resulting from the TCA process; and (iii) performing the TCA process according to the updated TCA parameters. Preferably the usage level is determined for Medium Access Control Identifiers (MAC_IDs). Further, the access-channel occupancy (ACO) may be determined and the base station may further base the updating of TCA parameters on the ACO. In an exemplary embodiment, the updated TCA parameters include the TCA count and/or the TCC wait timer.

20 Claims, 7 Drawing Sheets

TCA Count

| MAC_ID Usage \ ACO | 10-15% | 15-20% | 20+% |
|---|---|---|---|
| 50-70% | 4 | 5 | 6 |
| 70-90% | 3 | 4 | 5 |
| 90+% | 2 | 3 | 4 |

TCC Wait Timer (sec)

| MAC_ID Usage \ ACO | 10% | 15% | 20% |
|---|---|---|---|
| 50-70% | 5 | 6 | 7 |
| 70-90% | 4 | 5 | 6 |
| 90+% | 3 | 4 | 5 |

FIG. 7

DYNAMIC MANAGEMENT OF NETWORK-RESOURCE USAGE BASED ON NETWORK LOADING

BACKGROUND

Many people use access terminals, such as cell phones and personal digital assistants (PDAs), to communicate with cellular wireless networks. These access terminals and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data connectivity.

More recently, service providers have introduced access terminals and wireless networks that communicate using a protocol known as EV-DO, which stands for "Evolution Data Optimized." EV-DO networks, operating in conformance with industry specification IS-856, provide high rate packet-data service (including Voice over IP (VoIP) service) to access terminals using a combination of time-division multiplexing (TDM) on the forward link (from the network to access terminals) and CDMA technology on the reverse link (from access terminals to the network). Furthermore, some access terminals, known as hybrid access terminals or hybrid wireless access terminals, can communicate with both 1x networks and EV-DO networks.

In a typical cellular wireless network, an area is divided geographically into a number of cells and cell sectors, each defined by an RF radiation pattern from a respective antenna structure in the cellular wireless network. Within each cell sector, the RF radiation pattern provides an air interface over which access terminals may communicate with the cellular wireless network. In turn, the cellular wireless network may communicate with one or more other networks, such as the PSTN or a packet-switched network (e.g., the Internet). As such, when an access terminal is positioned within the coverage area of the cellular wireless network (e.g., in given cell sector), the access terminal can communicate with entities on the other networks via the cellular wireless network.

The RF air interface of any given cell sector in the cellular wireless network is typically divided into a plurality of channels for carrying communications between the access terminals and the cellular wireless network. For example, the RF air interface may include a plurality of forward-link channels, such as pilot channels, sync channels, paging channels, and forward-traffic channels, for carrying communications from the cellular wireless network to the access terminals. As another example, the RF air interface may include a plurality of reverse-link channels, such as access channels and reverse-traffic channels, for carrying communications from the access terminals to the cellular wireless network. However, the number of channels on the air interface, and thus the number of simultaneous communications the air interface can support, is limited by hardware and/or protocol constraints. As such, cellular wireless networks often try to conserve the limited supply of channels by assigning them on an as-needed basis.

When the cellular wireless network receives a request to set up a communication with a given access terminal (either from the access terminal itself, or another access terminal wishing to communicate with the given access terminal), the cellular wireless network may assign the given access terminal a traffic channel in the given cell sector by (i) reserving an available traffic channel for communication with the given access terminal, and (ii) sending the given access terminal a channel assignment message identifying the reserved traffic channel. Thus, a traffic channel assignment (TCA) message is typically used to notify an access terminal of the traffic channel that is assigned to the access terminal. As such, when an access terminal attempts to establish a connection to an access network, the access network may select a traffic channel for the access terminal, and send the access terminal a TCA message that identifies the selected traffic channel. Upon receipt of the channel assignment message, the given access terminal may acquire the identified traffic channel, and communication over the traffic channel may begin shortly thereafter.

Furthermore, when an access terminal receives a TCA message and tunes to the assigned traffic channel, the access terminal may notify the access network by sending a traffic-channel complete (TCC) message to the access network. Thus, if the access network does not receive a TCC complete message within a predetermined period of time, the access network assumes that the TCA message has not been properly received, and accordingly, re-transmits the TCA message to the access terminal. The access network then repeats this process until a TCC complete message is received, or until it reaches a predetermined number of attempts to transmit the TCA message (which in current networks is typically three).

OVERVIEW

In typical practice, by the time the access network sends a channel assignment message to the access terminal, the radio access network (RAN) will have reserved a traffic-channel resource for use by the access terminal and will hold that resource for the access terminal as part of the traffic channel assignment (TCA) process. If the call setup fails, then the access network releases the reserved resources. Unfortunately, however, there may be a limited supply of those traffic-channel resources that are reserved. For instance, the access network may reserve a Media Access Control address (MAC_ID) for use by the access terminal to engage in bearer communications, but there may be a limited pool of MAC_IDs. Given this limitation in the supply of the traffic-channel resource (e.g., MAC_IDs), and given that the access network reserves and holds the traffic-channel resource for the access terminal before call setup is successfully completed, existing access networks may inefficiently utilize traffic-channel resources. This may be especially true, for example, when call setup fails, as resources are held for an access terminal that ultimately did not connect and utilize the resources, and possibly in other scenarios as well.

Accordingly, in an exemplary embodiment, the access network may adjust certain TCA parameters effecting how the TCA process is carried out according to the usage level (i.e., network loading) of at least one traffic-channel resource, thereby managing the expected duration for which traffic-channel resources are reserved is reduced. More specifically, base stations typically maintain (i) a TCA count parameter, which indicates how many times a TCA message can be transmitted before call setup is deemed to be a failure (and resources are therefore released) and (ii) a TCC wait timer, which specifies the time period that the base station waits between successive TCA-message transmissions. Thus, by adjusting TCA parameters (such as the TCA count and TCC wait timer) based on the usage level of a traffic-channel resource, an access network can manage the expected duration of the TCA process, and thus manage how long resources are held, on average, during the TCA process. Accordingly, in an exemplary embodiment, a method is provided for dynamically intelligently update one or both of the TCA count and the TCC wait timer, based on the availability or lack of availability of one or more traffic-channel resource, such as MAC_IDs.

More generally, in one aspect, a method for managing usage of traffic-channel resources resulting from a traffic channel assignment (TCA) process is disclosed. The method comprises (i) a base station determining a usage level of at least one traffic-channel resource in a coverage area of the access network; (ii) based at least in part on the determined usage level, updating one or more TCA parameters affecting expected usage of the traffic-channel resource resulting from the TCA process; and (iii) performing the TCA process according to the updated TCA parameters.

In one embodiment, updating the one or more TCA parameters may comprise accessing a resource-reservation database to determine a value for each of the one or more TCA parameters that corresponds to the determined usage level, and then setting each of the one or more TCA parameters equal to the respective determined value. In another embodiment, updating the one or more TCA parameters may involve (a) if the determined usage level is high, then adjusting the one or more TCA parameters such that expected usage of the traffic-channel resource for the TCA process is reduced; and (b) if the determined usage level is low, then adjusting the one or more TCA parameters such that expected usage of the traffic-channel resource for the TCA process is increased. In yet another embodiment, updating the one or more TCA parameters may comprise (a) if the determined usage level is high and the TCA parameter is greater than a minimum threshold, then adjusting the TCA parameter such that expected usage of the traffic-channel resource for the TCA process is reduced; (b) if the determined usage level is low and the TCA parameter is less than a maximum threshold, then adjusting the TCA parameter such that expected usage of the traffic-channel resource for the TCA process is increased; and (c) otherwise, refraining from adjusting the one or more TCA parameters.

In another aspect, a system configured to manage usage of traffic-channel resources resulting from a TCA process is disclosed. The system comprises (i) at least one processor; and (ii) program logic stored in data storage and executable by the at least one processor to: (a) determine a usage level of at least one network resource in a coverage area of the access network; (b) based at least in part on the determined usage level, update one or more TCA parameters affecting expected usage of the traffic-channel resource resulting from the TCA process; and (c) cause a base station to carry out the TCA process according to the updated TCA parameters. The program logic may be further executable to access a resource-reservation database to determine a value for each of the one or more TCA parameters that corresponds to the determined usage level, and then set each of the one or more TCA parameters equal to the respective determined value.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

I. Wireless Network Architecture

Figure 1:
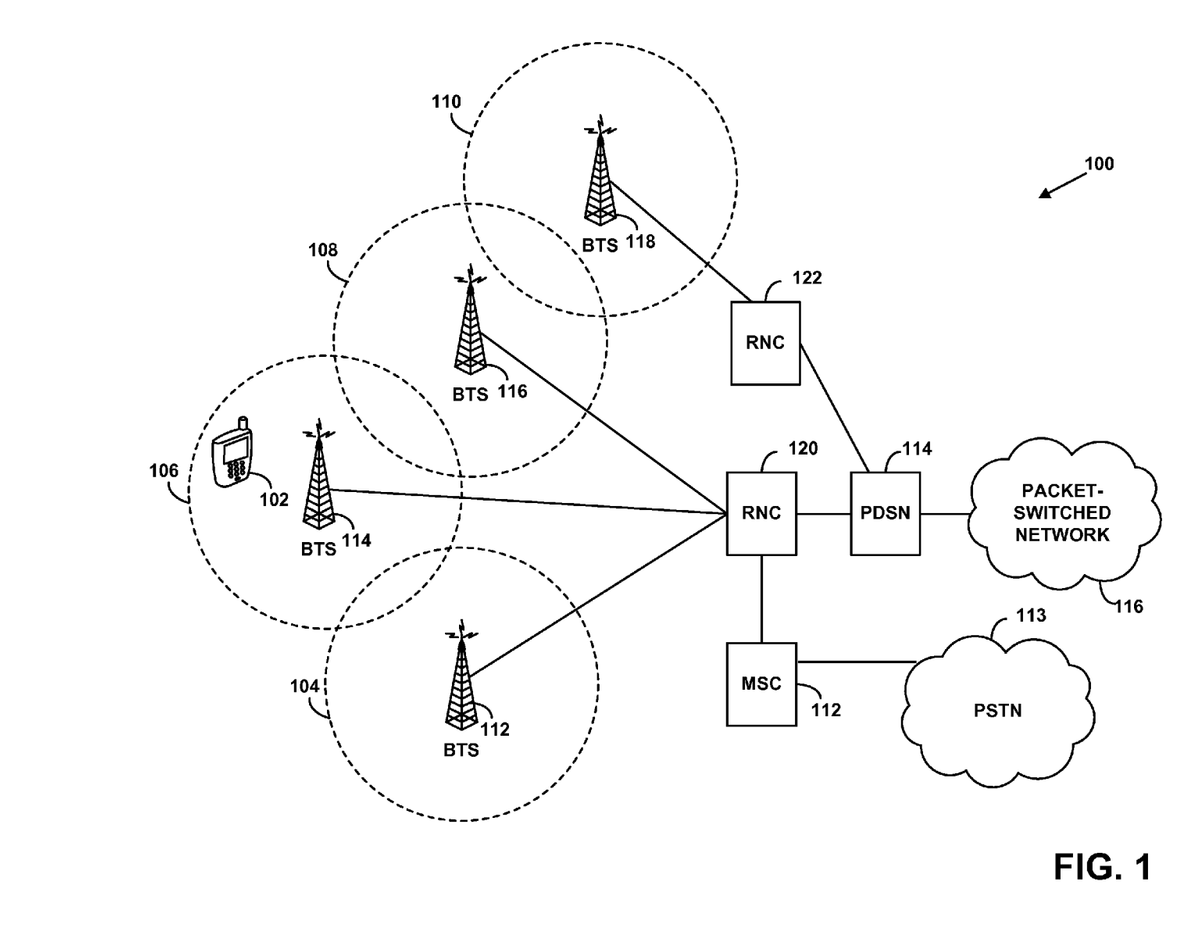
FIG. 1 is a simplified block diagram illustrating a wireless access network, in which an exemplary embodiment may be implemented.

FIG. 1 is a simplified block diagram illustrating a wireless access network 100, which may also be referred to as a radio access network (RAN). In order to provide wireless service, access network 100 may include numerous base transceiver station (BTS) towers, such as BTSs 112-118, which together provide substantially contiguous coverage for wireless subscribers. Each BTS 112-118 can be configured to define a respective cell site, as well as number of cell sectors, such as sectors 104-110. Groups of BTS towers in a given region will then typically be connected with a radio network controller (RNC) (also known as a base station controller (BSC)). In access network 100, BTSs 112-116 are connected to RNC 120, and BTS 110 is connected to RNC 122. An RNC may then connect with a switch, such as mobile switching center (MSC) 121, which provides connectivity with a transport network, such as a public switched telephone network (PSTN) 128, or with a gateway, such as a packet-data serving node (PDSN) 124, which provides connectivity with a packet-switched network 126 such as the Internet.

With this arrangement, when an access terminal 102 (such as a cellular telephone or wirelessly-equipped portable computer or personal digital assistant, for instance) is positioned in a sector, the access terminal 102 may communicate via an RF air interface with a serving BTS. For instance, when access terminal 102 is located in sector 106, the access terminal may connect to BTS 114. Consequently, a communication path can be established between the access terminal 102 and PSTN 128 or packet-switched network 126 via an RF air interface, BTS 114, RNC 120 and MSC 121 or gateway PDSN 124, respectively.

Communications between access terminal 102 and BTS 114 generally proceed according to one or more air interface protocols, such as Code Division Multiple Access (CDMA), Time Division Multiple Access (TDMA), Global System for Mobile Communications (GSM), 1xRTT, 1xEV-DO, iDEN, AMPS, GPRS, UMTS, EDGE, WiMAX (e.g., IEEE 802.16), LTE, microwave, satellite, MMDS, Wi-Fi (e.g., IEEE 802.11), and/or Bluetooth, among others. Air interface communications from the base station to the access terminal may be referred to as "forward link" or "downlink" communications, while those from the access terminal to the base station may be referred to as "reverse link" or "uplink" communications.

To provide the arrangement of FIG. 1 in practice, each access terminal is commonly equipped with a "mobile station modem" chipset such as one of the various "MSM" chipsets available from Qualcomm Incorporated, and each base station is commonly equipped with a "cell site modem" chipset such as one of the various "CSM" chipsets available from Qualcomm Incorporated. Preferably, the air-interface protocols under which service is provided by base station 108 include EV-DO. By way of example, each cell site modem can be a Qualcomm CSM6800™ chipset, and each mobile station modem can be an MSM6800™ chipset. Both the CSM6800™ chipset and MSM6800™ chipset have EV-DO operating modes (e.g., 1xEV-DO Rev. 0 or Rev. A), and each chipset can be programmatically set to operate in that mode. It should be understood that other chipsets, including upgrades to the chipsets named herein, as well as others providing similar functionality, may also be utilized without departing from the scope of the invention.

When an access terminal 102 connects to an access network via a BTS 114 and/or RNC 120, or when an incoming communication is received for the access terminal, the access network 100 may initiate a traffic channel assignment (TCA) process to assign a traffic channel to the access terminal. To do so, the access network 100 typically reserves traffic-channel resources for the access terminal, before proceeding to set up the connection with the access terminal. For example, in a given wireless coverage area, to reserve a 1xRTT channel for an access terminal, the access network 100 may reserve a Walsh code and a channel element upon receipt of a connection request from or incoming communication to an access terminal. As another example, to assign an EV-DO channel in a given wireless coverage area 106, the access network may reserve a MAC_ID for the access terminal. Other examples are possible as well.

After reserving resources for the access terminal, the TCA process involves the access network 100 establishing a connection with the access terminal. More specifically, the access network 100 may then send a channel assignment message to the access terminal, which notifies the access terminal of its assigned air-interface traffic channel. In an exemplary embodiment, an access network using 1xRTT sends a traffic channel assignment (TCA) message, which includes a Walsh Code, a PN offset, and/or a MAC_IDentifier (MAC_ID) that corresponds to the assigned traffic channel. The TCA message may also contain an identifier of its intended recipient, which may be the given access terminal 102. The identifier may be, for example, a mobile identification number (MIN), an international mobile subscriber identity (IMSI), a unicast access terminal identifier (UATI), or some other identifier for an access terminal 102. Other techniques for assigning a traffic channel, and notifying an access terminal of the assignment, are also possible.

Upon receipt of the TCA message, the access terminal 102 tunes to the assigned traffic channel (as indicated by the Walsh code and/or MAC_ID in the TCA message) and sends an acknowledgment message (ACK) to the access network 100, and the traffic channel acquisition process is then initiated on the associated traffic channel. This acquisition process involves transmission of preamble/null frames on the forward link and the reverse link. Then, once the preamble/null frames are received successfully, the access terminal 102 may send a Traffic Channel Complete (TCC) message to BTS 114. Alternatively, in 1xRTT compliant communications, the given access terminal 102 may send a Preamble message and/or another type of ACK message to the BTS 114. Other variations on the process for establishing a traffic channel are also possible.

Under IS-856, access network 100 may be configured to transmit TCA messages according to certain parameters. For example, the access network 100 may be configured to re-transmit a TCA message to an access terminal when a previous attempt has been unsuccessful, and in particular, to retransmit in the event that no ACK is received from the access terminal 102 after a predetermined period of time. As such, a "TCA count" parameter may be utilized to indicate a maximum number of times the access network should send a TCA message to the access terminal before determining the call setup to be a failure. Further, the access network 100 preferably maintains an attempt number for each TCA message indicating how many attempts to transmit the TCA message have been made. As such, when the access network sends a TCA message, the access network may increment the value of TCA count associated with the TCA message. And further, a "TCC wait timer" parameter may indicate the period of time that the access network waits to receive the TCC message from an access terminal, after the transmission of a TCA message to the access terminal.

Accordingly, when the access network 100 first transmits a TCA message, the access network may (i) increment the attempt number for the TCA message from zero to one and (ii) start the TCC wait timer. If a TCC complete message is received before the TCC wait timer expires, then the assignment is considered successful, and communications can proceed via the assigned traffic channel. If, on the other hand, TCC wait timer expires without receipt of the TCC message, the access network checks whether the attempt number for the TCA message exceeds the TCA count, before another attempt to transmit the TCA message is made. If the attempt number exceeds the TCA count parameter, the access network deems the call setup a failure and ceases efforts to transmit the TCA message. Otherwise, the access network re-transmits the TCA message and repeats this process until a TCC message is received from the access terminal, or the attempt number exceeds the TCA count.

In a further aspect, the access network 100 preferably maintains log data that indicates over time (e.g., every minute or every five minutes) the number or percentage of access channel timeslots that are being used. (In practice, the an access channel timeslot can be considered to be occupied if it contains energy that is sufficient to be an access probe, even if the timeslot does not actually contain a CRC-verifiable access probe. Alternatively, other rules can be applied to determine if a given timeslot is occupied.) The BSC may use this number, percentage, or some other measure at a given instant, or statistically combined (e.g., averaged) over a designated time period, as the measure of the sector's access channel occupancy (ACO) for the reverse-link.

Note that herein, while the ACO is technically an indicator related to the reverse-link access channel, the access channel may be considered a traffic-channel resource, since access terminals send messages involved in the TCA process (such as TCC complete messages) via the access channel. Thus, the ACO may also be considered as an indication of the usage-level of a traffic-channel resource (i.e., as a usage level of the reverse-link access channel in a given coverage area.

II. Exemplary System

Figure 2:
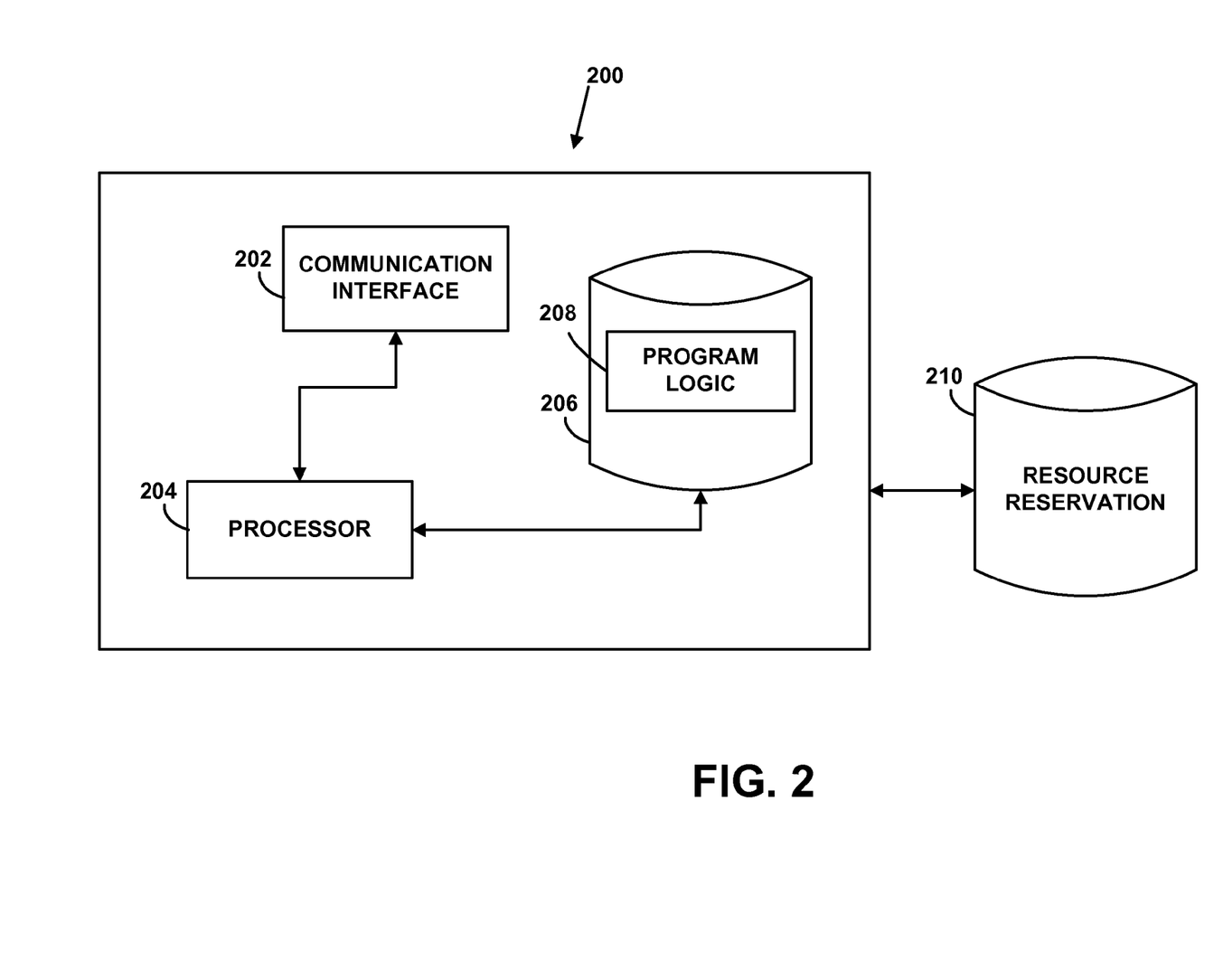
FIG. 2 is a block diagram illustrating a system that is configured to manage usage of traffic-channel resources, according to an exemplary embodiment.

FIG. 2 is a block diagram illustrating a system 200 that is configured to manage usage of traffic-channel resources, according to an exemplary embodiment. The system includes a communication interface 202, a processor 204, and data storage 206. Processor 204 may be configured interact with and/or control communication interface 202 to provide and/or initiate functionality described herein. Further, processor 204 may be configured to execute instructions stored on data storage 206 to carry out the functionality of system 200 described herein (including, but not limited to, exemplary methods described herein). The instructions may take the form of executable program code or program logic, or may take other forms as appropriate.

The system 200 preferably takes the form of, or is implemented in association with, a base station (e.g., BTS 114 and/or RNC 120), and preferably includes program logic 208 stored in data storage 206 and executable by processor 204 to periodically adjust at least one TCA parameter, such as the TCA count and/or the TCC wait timer, in order to more efficiently use traffic-channel resources during the traffic-channel-assignment process (TCA process). In particular, the program logic may be executable to (a) determine a usage level of at least one traffic-channel resource (which preferably include resources that are reserved during the TCA process, such as MAC_IDs); (b) based at least in part on the determined usage level, update one or more TCA parameters (which preferably include the TCA count and/or the TCC wait timer); and (c) cause a base station to carry out the TCA process according to the updated TCA parameters. More generally, the program logic may be executable to initiate and/or carry out any of the functionality described in reference to a base station herein, and possibly functionality described in reference to other network entities as well.

By dynamically updating TCA parameters, such as the TCA count and/or the TCC wait timer, the base station may intelligently control the usage of traffic-channel resources, such as MAC_IDs, for the TCA process. For example, the base station may adjust resource-reservation parameters such that more or less resources are reserved, depending upon the current usage level of the certain network resources, which are preferably traffic-channel resources. Thus, if traffic-channel resources are scarce (i.e.; usage is high), TCA parameters may be adjusted such that resources are not reserved for as long for a given access terminal. In general, it should be understood that the base station may be configured to adjust the TCA parameters according to the usage level of network resources, as a matter of engineering design choice.

Therefore, in a further aspect, system 200 may include or have access to a resource reservation database 210, which provides values for resource reservation parameters corresponding to various usage levels. As such, program logic 208 may be further executable to access the resource reservation database 210 to determine values for TCA parameters corresponding to the current usage level or usage levels of network resources, and to set these resource-reservation parameters to the determined values.

Figure 6:
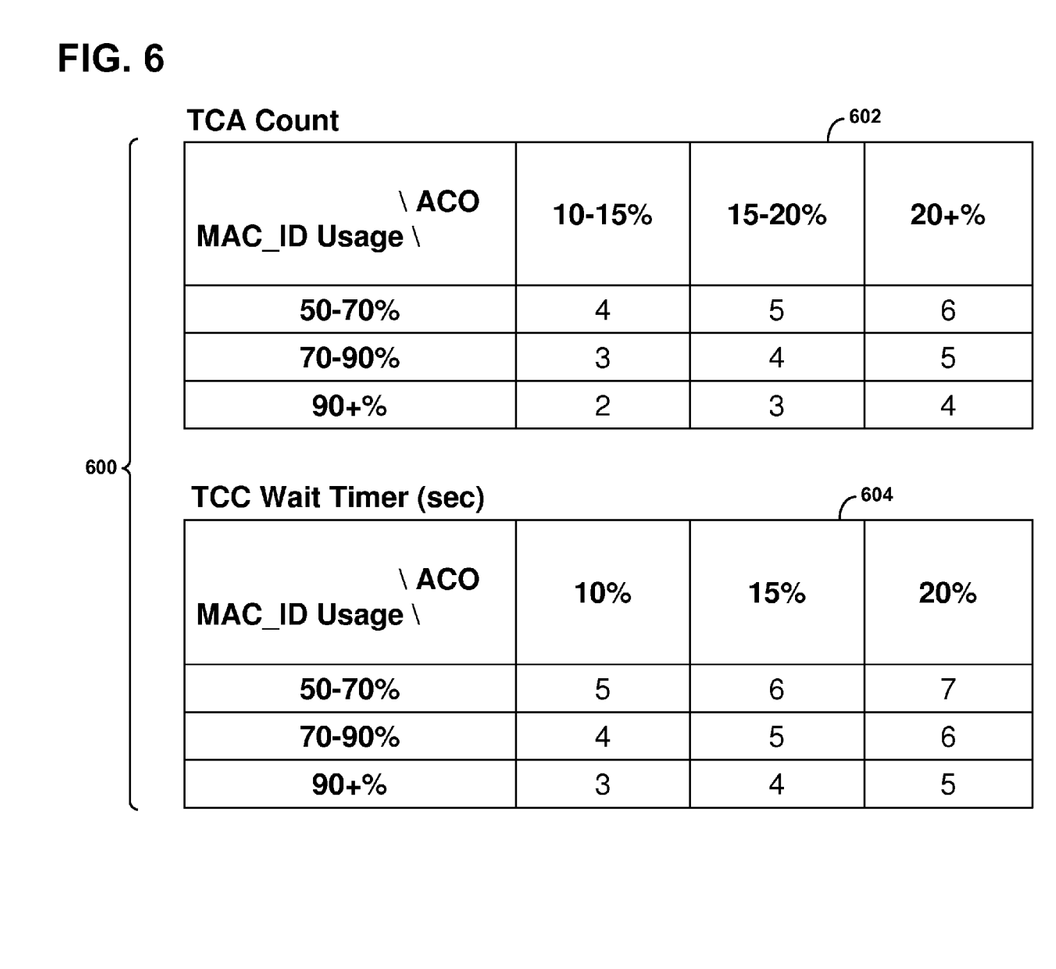
FIG. 6 is a diagram illustrating a resource-reservation database, according to any exemplary embodiment.

FIG. 6 is a diagram illustrating a resource-reservation database 600, according to any exemplary embodiment. The database 600 includes a TCA-count table 602 and a TCC-wait-timer table 604, which indicate values for the respective parameters corresponding to various MAC_ID usage and ACO levels.

Database 600 provides a mapping of MAC_ID usage level ranges and ACO level ranges to specific TCA-count values and TCC-wait-timer values. In the illustrated example, default settings for the TCA-count and TCC wait timer are used until MAC_ID usage reaches 50% or more, and/or until ACO reaches 10% or more. Above 50%, MAC_ID usage may be divided into three ranges: a high-utilization range, which is 90% or greater in table 602, a medium-utilization range, which is 70 to 90% in table 602, and a low-utilization range, which is 50 to 70% in table 602. Similarly, ACO may be divided into three ranges above 10% occupancy: a high-occupancy range, which is 20% or greater in table 604, a medium-occupancy range, which is 15 to 20% in table 604, and a low-occupancy range, which is 10 to 15% in table 604. As shown, combinations of these ranges are mapped to specific TCA-count values and TCC-wait-timer values. For example, a MAC_ID usage level of 58%, and an ACO of 32%, maps to a TCA-count value of six, as shown by table 602, and maps to a TCC-wait-timer value of 7, as shown by table 604. It should be understood that tables 602 and 604 show only a portion of the mapping, and that a mapping for other ranges and combinations of ranges between zero and 50% MAC_ID usage, and zero to 10% ACO, may also be defined. More generally, it should be understood that this is but one exemplary mapping, and that MAC_ID usage and/or ACO, as well as any other network-resource usage levels, may be divided into ranges and mapped to specific values for TCA parameters, in any appropriate matter, as a matter of engineering design choice.

III. Exemplary Methods

Figure 3:
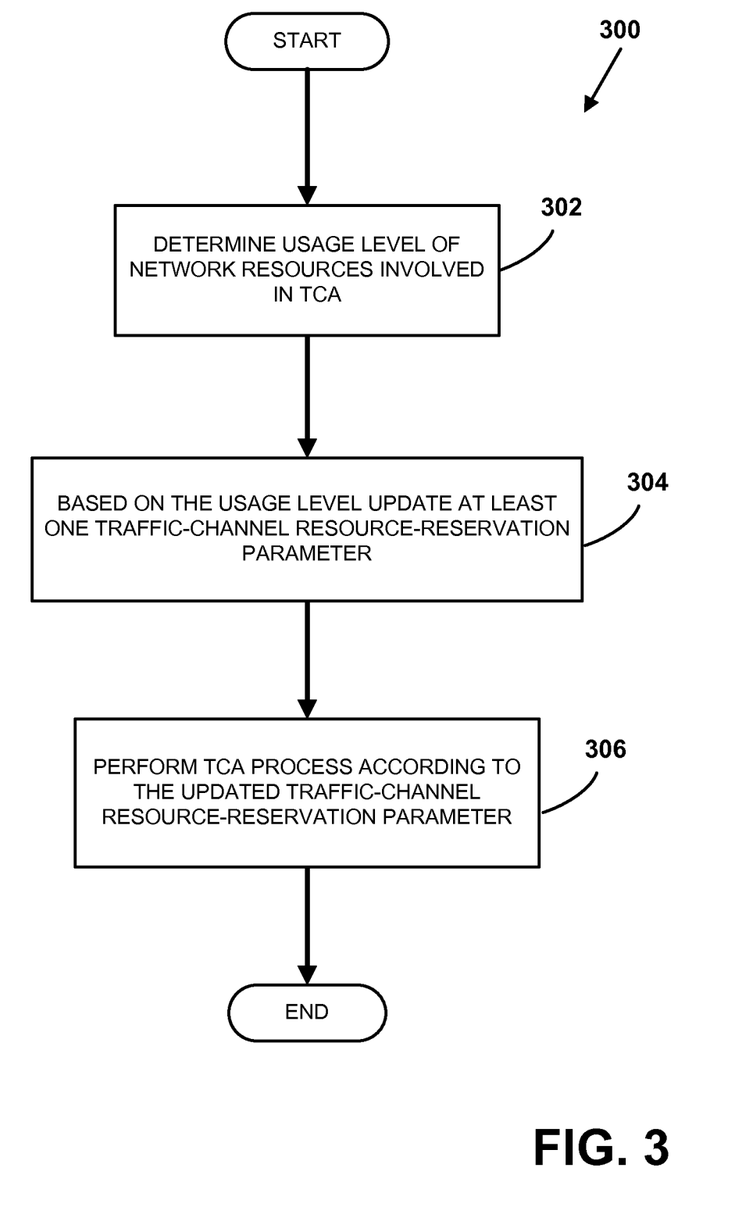
FIG. 3 is a flow chart illustrating a method for managing usage of traffic-channel resources, according to an exemplary embodiment.

FIG. 3 is a flow chart illustrating a method 300 for managing usage of traffic-channel resources, according to an exemplary embodiment. The method 300 is preferably carried out at a base station, but may also be carried out by other entities or combinations of entities in an access network. The method is preferably used to periodically update the TCA count and/or the TCC wait timer used for the TCA process, but may be used to update other TCA parameters as well. In particular, method 300 involves the base station determining a usage level of at least one traffic-channel resource, as shown by block 302. Then, based at least in part on the determined usage level, the base station updates one or more TCA parameters, as shown by block 304. The base station then performs the TCA process according to the updated TCA parameters, as shown by block 306.

The step of updating the at least one TCA parameter may involve the base station accessing a resource-reservation database. Specifically, the base station may itself include a database, or be provided access to a database via a BSC, which maps network-resource usage levels to corresponding values for TCA parameters. As such, the base station or BSC may query the resource-reservation database with the determined usage level of one or more network resources to determine the corresponding values for TCA parameters, and then set the TCA parameters equal to the determined values.

Alternatively, the step of updating the at least one TCA parameter may involve the base station determining whether the usage level is high or low. To do so, a certain range of usage levels (or usage levels above a predetermined threshold) may be classified as "high", while another range of usage levels (or usage levels below a predetermined threshold), may be classified as "low". Further, usage levels may be subdivided into more than two ranges with each range having corresponding values for the TCA parameters. Alternatively, the determination of whether a usage level is "high" or "low" may be made relative to a previously determined usage level (or possibly in comparison to an average usage level over a predetermined period of time or a predetermined average usage level). In such embodiments, if the determined usage level is higher than the previously determined usage level, the usage level is considered high, and vice versa. In any of these scenarios, if the determined usage level is high, then the base station may, for example, adjust one or more of the TCA parameters such that fewer resources are reserved, on average, during the TCA process. On the other hand, if the determined usage level is low, then the base station may adjust one or more of the TCA parameters such that, on average, more resources are reserved.

Figure 4:
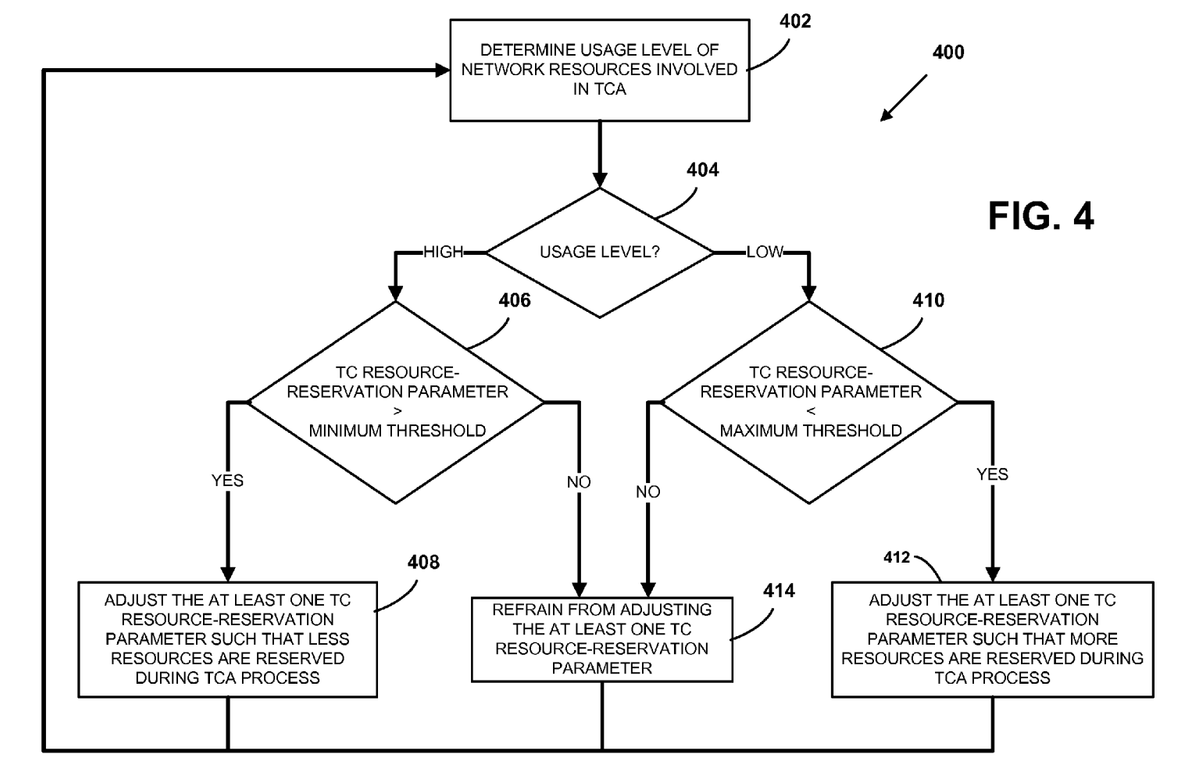
FIG. 4 is another flow chart illustrating a method for managing usage of traffic-channel resources, according to an exemplary embodiment.

FIG. 4 is another flow chart illustrating a method 400 for managing usage of traffic-channel resources, according to an exemplary embodiment. Method 400 illustrates the above-described embodiment, where TCA parameters are updated based upon whether the determined usage level is high or low. However, method 400 further involves checking whether each TCA parameter is within a predetermined range (defined by minimum and maximum thresholds), before adjusting the parameter.

In particular, method 400 involves the base station determining a usage level of at least one network resource, as shown by block 402. The base station then determines whether the usage level is high or low (using one of the techniques described above, or possibly another technique), as shown by block 404. If the usage level is high, the base station then checks whether the TCA parameter to be updated is greater than a minimum threshold value for the parameter, as shown by block 406. Then, if the resource-reservation parameter is greater than the minimum threshold, the base station adjusts the TCA parameters such that expected usage of the traffic-channel resource during the TCA process is reduced, as shown by block 408. In the event that the usage level determined in block 404 is low, the base station checks whether the TCA parameter to be updated is less than a maximum threshold value for the parameter, as shown by block 410. Then, if the TCA parameter is less than the maximum threshold, the base station adjusts the resource-reservation parameter such that expected usage of the traffic-channel resource during the TCA process is increased (or possibly just maintained), as shown by block 412. Otherwise, (e.g., if the usage level is high and the resource-reservation parameter is at the minimum threshold, or if the usage level is low and the resource-reservation parameter is at the maximum threshold), the base station typically refrains from adjusting TCA parameters, as shown by block 414. Note, however, in the event that a TCA parameter is below or above the minimum threshold or the maximum threshold, respectively, the base station may adjust the resource-reservation parameter so that it falls within the range defined by the minimum and maximum threshold.

A base station may perform an exemplary method, such as method 300 or method 400, periodically, so that TCA parameters are updated regularly to reflect current or recent usage of network resources. In FIG. 4, the periodic performance of method 400 is indicated by the arrows from each of blocks 408, 412, and 414, to block 402. Alternatively, the base station may be configured to monitor the usage level of network resources and detect when there has been a change in usage, such that TCA parameters should be updated.

In an exemplary embodiment, the one or more TCA parameters that are updated preferably include the TCA count and/or the TCC wait timer. Further, the network resources for which a usage level is determined, and upon which updates are based, typically include the number or percentage of MAC_IDs in use, and preferably include the ACO as well. It should be understood, however, that updates to TCA parameters may additionally or alternatively be based on usage of other network resources, and that other TCA parameters may be updated as well.

Additionally or alternatively, updating TCA parameters may involve the base station instructing an access terminal to update access terminal resource-reservation parameters, such as a Traffic Channel Complete Count (TCC count). The TCC count is typically is hard-coded into the mobile chipset of the access terminal, and typically operates in respect to the TCC Complete message, in the same manner as the TCA count does in respect to the TCA message. For example, according to an exemplary embodiment, the default TCC count may be three seconds. The TCC count may be kept at three attempts until MAC_ID usage reaches 70%. Then, when MAC_ID usage is between 70% and 90%, the TCC count may be reduced to two attempts, and when MAC_ID usage is greater than \90%, the TCC count may be further reduced to one attempt. Other examples are also possible.

Figure 5:
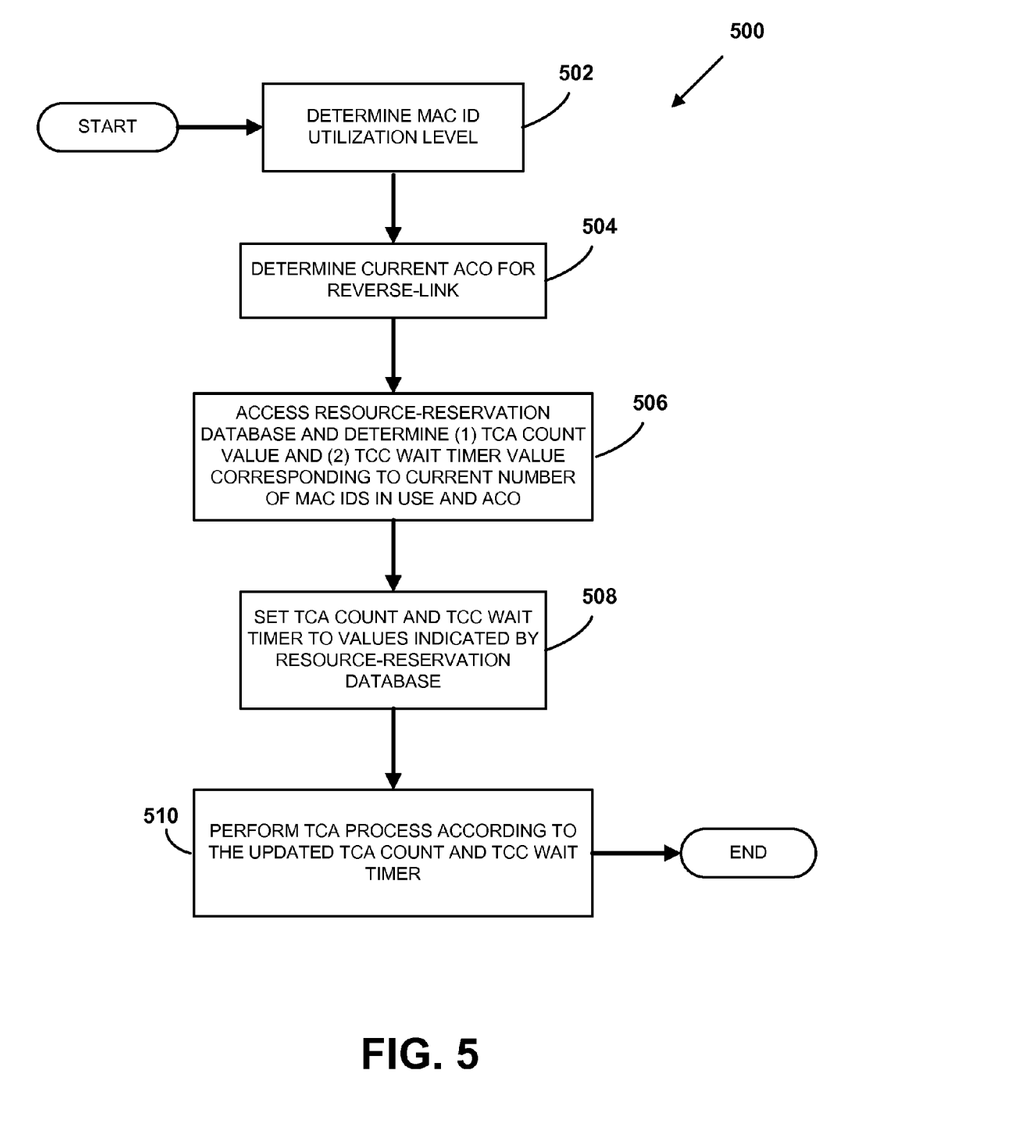
FIG. 5 is another flow chart illustrating a method for managing usage of traffic-channel resources, according to an exemplary embodiment.

FIG. 5 is another flow chart illustrating a method 500 for managing usage of traffic-channel resources, according to an exemplary embodiment. In method 500, the TCA count and the TCC wait timer are the TCA parameters that are updated, and the updates are based upon the MAC_ID usage and ACO on the reverse-link.

More specifically, method 500 involves a base station determining the MAC_ID usage level, as shown by block 502. The base station also determines the current ACO on the reverse-link, as shown by block 504. The base station then accesses a resource-reservation database to determine a TCA-count value and TCC-wait-timer value that correspond to the current MAC_ID usage, as shown by block 506. Next, the base station sets the TCA count and the TCC wait timer to the respective values indicated by the resource-reservation database, as shown by block 508. When the base station needs to assign a traffic channel to an access terminal, the base station carries out the TCA process according to the TCA count and the updated TCC wait timer, as shown by block 510.

To determine the MAC_ID usage level, the base station may determine the number of MAC_IDs in use (or conversely, the number of MAC_IDs that are still available). In practice, this determination may be made based on all MAC_IDs that are defined, or preferably, based on the 114 that are available to be assigned to users. Alternatively, the base station may determine the percentage of MAC_IDs that are already assigned to access terminals (or conversely, the number of MAC_IDs that are still available). Other techniques may also be used to determine the MAC_ID usage level, without departing from the scope of the invention.

Figure 7:
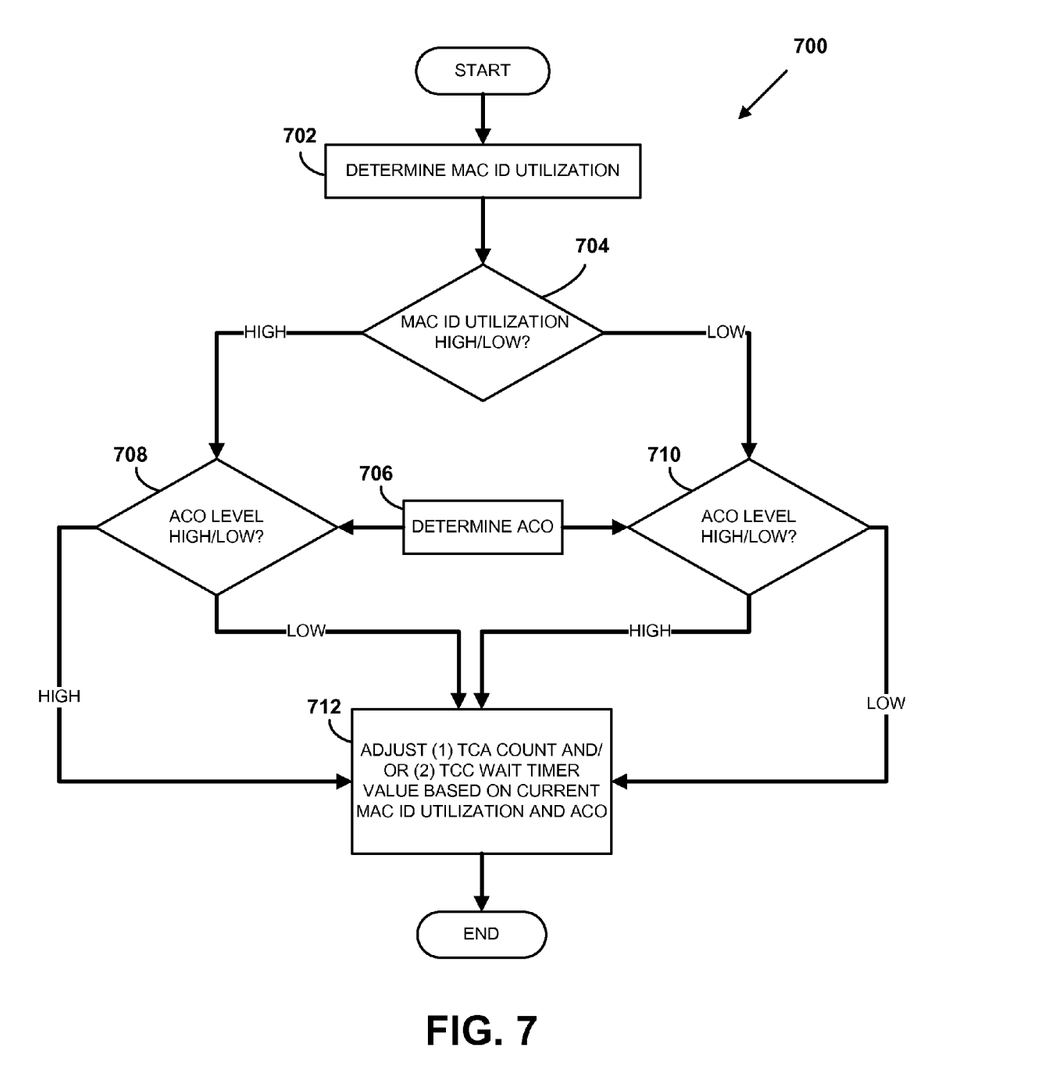
FIG. 7 is another flow chart illustrating a method for managing usage of traffic-channel resources, according to an exemplary embodiment.

FIG. 7 is another flow chart illustrating a method 700 for managing usage of traffic-channel resources, according to an exemplary embodiment. In method 700, one or both of the TCA count and the TCC wait timer may be updated, depending upon the current MAC_ID usage and ACO on the reverse-link.

More specifically, method 700 involves initially determining the MAC_ID usage level, as shown by block 702. The base station may then determine whether the MAC_ID usage is high or low, as shown by block 704. In either case, the base station also determines whether the ACO is high or low, as shown by block 708 (in the case of high MAC_ID usage) and block 710 (in the case of low MAC_ID usage). Then, the base station adjusts the TCA count and/or the TCC wait timer based on the MAC_ID usage (high or low) and the ACO (high or low), as shown by block 712.

In a further aspect of method 700, whenever the base station determines that it should update a TCA parameter such as TCA count and/or TCC wait timer (or possibly even before this determination is made), the base station may check whether the TCA parameter is within a predetermined range defined for the parameter, in a similar manner as described in reference to FIG. 4. As such, the base station will not increase or decrease a given TCA parameter, if doing so would result in the value of the parameter being outside of the range defined by a minimum and maximum threshold for the parameter. For example, a base station may be configured such that the TCA count remains between two and five, and TCC wait timer is between three to ten seconds. Other examples are also possible.

The manner in which the TCA count and the TCC wait timer are adjusted in method 700 may vary according to the current MAC_ID usage and ACO. Further, the manner in which these parameters are adjusted may vary based on the engineering goals of the network service provider. For example, in some instances, such as where there are few remaining unused MAC_IDs and/or in a coverage area where there is heavy traffic, the goal may be helping to optimize MAC_IDs that are available for new connections (or other purposes). In that case, reducing the TCA count means that less attempts to transmit a TCA messages are made before the TCA message is deemed to have failed, which in turn means that reserved traffic-channel resources (MAC_IDs, etc.) are released more quickly in the event of TCA message failure. Similarly, reducing the TCA wait timer decreases the time between TCA-message transmission attempts, which causes successive transmission attempts to occur more rapidly, which on average results in reserved traffic-channel resources (MAC_IDs, etc.) being released more quickly.

On the other hand, the manner in which the TCA count and the TCC wait timer are adjusted may also take into account quality-of-service (QoS) provided to access terminals. In particular, increasing the TCA account, and thus the number of times a base station can retransmit a TCA message, increases the probability that an access terminal will receive the TCA message. Similarly, increasing the TCC wait timer may increase the amount of time a base station waits for the TCC complete message, and thus may increase the probability that the base station receives the TCC complete message. Other factors may also be taken into consideration when determining how to adjust the TCA count and/or TCC wait timer.

Referring now to the scenario in method 700 where the MAC_ID usage is high and the ACO is high as well, one of the engineering design goals may be decreasing the amount of traffic-channel resources that are reserved, but not yet in use, at a given time, so that resources are more readily available for new traffic-channel assignments. Accordingly, both the TCA count and the TCC wait timer may be reduced. Alternatively, a service provider may desire to balance conservation of traffic-channel resources with QoS considerations. Thus, in some embodiments, when the reverse-link is heavily loaded (as indicated by a high ACO), the base station may reduce the TCA count, but leave the TCC wait timer unchanged, or possibly even increase the TCC wait timer. For example, by increasing the TCC wait timer, the base station may increase the probability of receiving the TCC complete message in a response to a given TCA message transmission. As such, the base station may wait longer between transmissions of the TCA message, but reduce the number of times it transmits the TCA message, thus decreasing the overall duration for which traffic-channel resources are reserved for a given access terminal. For instance, if the TCA count is set to three, and the TCA wait timer is set at four seconds, the overall period during which resources are reserved (in the event of failure) is twelve seconds. The base station may reduce the TCA count to two, but increase the TCC wait timer to three seconds, while still reducing the overall period during which resources are reserved, which is then eight seconds.

Referring now to the scenario illustrated in method 700 where the MAC_ID usage is high, but the ACO is low, one of the engineering design goals may again be decreasing the amount of traffic-channel resources that are reserved, but not yet in use, at a given time, so that resources are more readily available for new traffic-channel assignments. Thus, both the TCA count and the TCC wait timer may be reduced. However, unlike the scenario where the ACO was also high, when MAC_ID usage is high but the ACO is low, there is a greater probability that a TCC complete message will be received by the base station, and on average the base station may receive the TCC complete message more quickly (due to increased bandwidth and/or less interference on the reverse link, as indicated by the lower ACO). Therefore, since the base station expects to receive the TCC complete message more quickly, the TCC wait timer may be decreased to a greater extent than when the ACO is high. Alternatively or additionally, to balance conservation of traffic-channel resources with QoS goals, the base station may decrease the TCC wait timer, but leave unchanged or increase the TCA count, such that the reservation of resources is still reduced. For instance, if the TCA count is set to three, and the TCA wait timer is set at five seconds, the overall period during which resources are reserved (in the event of failure) is fifteen seconds. The base station may thus reduce the TCC wait timer to three seconds, but increase the TCA count to four, while still reducing the overall period during which resources are reserved (in the event of failure), which is then twelve seconds.

Referring now to the scenario in method 700 where the MAC_ID usage is low, but the ACO is high, engineering design goals may, for example, shift to improving QoS, by increasing the probability that a traffic channel is successfully assigned. Accordingly, the base station may increase the TCA count. The base station may also increase the TCC wait timer to allow more time to receive the TCC complete message. Increasing the TCC wait timer may be particularly beneficial in heavily-loaded reverse-link conditions (as indicated by the higher ACO), as it may help increase the probability that the base station receives a TCC complete message successfully in such unfavorable reverse link conditions (e.g., limited bandwidth and/or higher levels of interference). Alternatively, to balance QoS goals with conservation of traffic-channel resources, the base station may increase the TCC wait timer, but leave unchanged or decrease the TCA count such that the probability of receiving the TCC complete message is still improved.

Referring now to the scenario in method 700 where the MAC_ID usage is low and the ACO is low as well, engineering design goals may again focus on improving QoS and increasing the probability that a traffic channel is successfully assigned to each access terminal. Accordingly, the base station may increase the TCA count and the TCC wait timer. However, since the ACO is low, the base station may expect to receive the TCC complete message more quickly, on average, than when ACO is high. Therefore, to balance QoS with conservation of traffic-channel resources, the base station may alternatively leave unchanged or reduce the TCC wait timer.

As mentioned, when the reverse link is more-heavily loaded (and there is a higher ACO), a longer TCC wait timer may increase the probability that a TCC complete message is successfully received. However, in some scenarios, a very high ACO may mean that an ACK transmitted by the access terminal, such as the TCC complete message, is less likely or even unlikely to be received successfully at the access network. As such, holding limited traffic-channel resources, such as a MAC_ID, for a longer period of time may provide little to no improvement in QoS. This is particularly so when there is high utilization of the traffic-channel resource at the time (e.g., a large number of MAC_IDs currently in use or reserved). Consequently, in some embodiments, when the ACO high, the base station may reduce or refrain from adjusting the TCA count and/or the TCC wait timer, regardless of whether the MAC_ID usage is high or low.

It should be understood that the TCA-parameter adjustments described in reference to 700 and elsewhere herein are provided as examples. The same engineering design goals may be met or balanced with other goals by other types of adjustments to the TCA parameters. Further, when engineering design goals vary, the manner in which TCA parameters are adjusted may vary as well.

In general, exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

We claim:

1. In an access network, a method for managing usage of traffic-channel resources that results from a traffic channel assignment (TCA) process, the method comprising:
   a base station determining a usage level of at least one traffic-channel resource in a coverage area of the access network, wherein the base station is configured to use the TCA process to assign a separate traffic channel in the coverage area to each of one or more access terminals, and each separately assigned traffic channel accounts for a respective amount of usage of at least a portion of the at least one traffic-channel resource,
   and wherein determining the usage level of the at least one traffic-channel resource in the coverage area comprises determining an amount of the at least one traffic-channel resource utilized as a result of the base station having assigned one or more separate traffic channels in the coverage area;
   based at least in part on the determined usage level, updating one or more TCA parameters for the TCA process, wherein the TCA process is configured for assigning respective traffic channels to one or more access terminals for establishing communication sessions in the coverage area, and wherein the one or more TCA parameters are updated so as to affect expected usage of the traffic-channel resource that results from the TCA process; and
   after updating the one or more TCA parameters, performing the TCA process according to the updated TCA parameters for at least a first access terminal.

2. The method of claim 1, wherein updating the one or more TCA parameters comprises:
   accessing a resource-reservation database to determine a value for each of the one or more TCA parameters that corresponds to the determined usage level; and
   setting each of the one or more TCA parameters equal to the respective determined value.

3. The method of claim 1, wherein updating the one or more TCA parameters comprises:
   if the determined usage level is high, then adjusting the one or more TCA parameters such that expected usage of the traffic-channel resource for the TCA process is reduced; and
   if the determined usage level is low, then adjusting the one or more TCA parameters such that expected usage of the traffic-channel resource for the TCA process is increased.

4. The method of claim 1, wherein updating at least one of the TCA parameters comprises:
   if the determined usage level is high and the TCA parameter is greater than a minimum threshold, then adjusting the TCA parameter such that expected usage of the traffic-channel resource for the TCA process is reduced;
   if the determined usage level is low and the TCA parameter is less than a maximum threshold, then adjusting the TCA parameter such that expected usage of the traffic-channel resource for the TCA process is increased; and
   otherwise, refraining from adjusting the one or more TCA parameters.

5. The method of claim 1, wherein updating the one or more TCA parameters comprises updating at least one of (a) a traffic channel assignment (TCA) count and (b) a traffic channel confirmation (TCC) wait timer.

6. The method of claim 5, wherein updating the one or more TCA parameters comprises:
   accessing a resource-reservation database to determine at least one of (a) a TCA-count value that corresponds to the determined usage level and (b) a TCC-wait-timer value that corresponds to the determined usage level; and
   at least one of (a) setting the TCA count equal to the determined TCA-count value and (b) setting the TCC wait timer equal to the determined TCC-timer value.

7. The method of claim 6, wherein updating the one or more TCA parameters comprises:
   if the determined usage level is high and the TCC wait timer is greater than a minimum threshold value, then decreasing the TCC wait timer;
   if the determined usage level is low and the TCC wait timer is less than a maximum threshold value, then increasing the TCC wait timer; and
   otherwise, refraining from adjusting the TCC wait timer.

8. The method of claim 5, wherein updating the one or more TCA parameters comprises:
   if the determined usage level is high, then at least one of (a) decreasing the TCA count and (b) decreasing the TCC timer; and
   if the determined usage level is low, then at least one of (a) increasing the TCA count and (b) increasing the TCC timer.

9. The method of claim 5, wherein updating the one or more TCA parameters comprises:
   if the determined usage level is high and the TCA count is greater than a minimum threshold value, then decreasing the TCA count;
   if the determined usage level is low and the TCA count is less than a maximum threshold value, then increasing the TCA count; and
   otherwise, refraining from adjusting the TCA count.

10. The method of claim 1, further comprising:
    the base station determining an access-channel occupancy (ACO) for a reverse-link access channel in the coverage area;
    wherein the updating of the one or more TCA parameters is conditioned upon the determined ACO being greater than a threshold ACO.

11. The method of claim 10, wherein updating the one or more TCA parameters comprises:
    if the determined MAC_ID usage level is high and the ACO is high, then using a first adjustment technique to update the one or more TCA parameters;
    if the determined MAC_ID usage level is high and the ACO is low, then using a second adjustment technique to update the one or more TCA parameters;
    if the determined MAC_ID usage level is low and the ACO is high, then using a third adjustment technique to update the one or more TCA parameters; and
    if the determined MAC_ID usage level is low and the ACO is low, then using a fourth adjustment technique to update the one or more TCA parameters.

12. The method of claim 1, wherein determining the usage level of the at least one traffic-channel resource in the coverage area of the access network further comprises at least one of:
 (a) the base station determining a MAC_ID usage level; and
 (b) the base station determining an access-channel occupancy (ACO) for a reverse-link access channel in the coverage area.

13. The method of claim 12, wherein updating the one or more TCA parameters comprises:
 accessing a resource-reservation database to determine a value for each of the one or more TCA parameters that corresponds to the determined MAC_ID usage level and the determined ACO; and
 setting the one or more TCA parameters equal to the determined value.

14. The method of claim 12, wherein updating the one or more TCA parameters comprises at least one of (a) updating a traffic channel assignment (TCA) count and (b) updating a traffic channel confirmation (TCC) wait timer.

15. The method of claim 14:
 wherein updating the TCA count comprises:
 accessing a resource-reservation database to determine a TCA-count value that corresponds to the MAC_ID usage level and the determined ACO; and
 setting the TCA count equal to the determined TCA-count value; and
 wherein updating the TCC wait timer comprises:
 accessing the resource-reservation database to determine a TCC-timer value that corresponds to the MAC_ID usage level and the determined ACO; and
 setting the TCC wait timer equal to the determined TCC-timer value.

16. A system configured to manage usage of traffic-channel resources that results from a traffic channel assignment (TCA) process in an access network, the system comprising:
 at least one processor; and
 program logic stored in data storage and executable by the at least one processor to:
 determine a usage level of at least one network resource in a coverage area of the access network, wherein the system is configured to use the TCA process to assign a separate traffic channel in the coverage area to each of one or more access terminals, and each separately assigned traffic channel accounts for a respective amount of usage of at least a portion of the at least one traffic-channel resource,
 and wherein determining the usage level of the at least one traffic-channel resource in the coverage area comprises determining an amount of the at least one traffic-channel resource utilized as a result of the system having assigned one or more separate traffic channels in the coverage area;
 based at least in part on the determined usage level, update one or more TCA parameters for the TCA process, wherein the TCA process is configured for assigning respective traffic channels to one or more access terminals for establishing communication sessions in the coverage area, and wherein the one or more TCA parameters are updated so as to affect expected usage of the traffic-channel resource that results from the TCA process; and
 after the one or more TCA parameters are updated, cause a base station to carry out the TCA process according to the updated TCA parameters for at least a first access terminal.

17. The system of claim 16, wherein the program logic stored in data storage and executable by the at least one processor to update the one or more TCA parameters comprises:
 program logic stored in data storage and executable by the at least one processor to:
 access a resource-reservation database to determine a value for each of the one or more TCA parameters that corresponds to the determined usage level; and
 set each of the one or more TCA parameters equal to the respective determined value.

18. The system of claim 16, wherein, for at least one of the TCA parameters, the program logic stored in data storage and executable by the at least one processor to update the TCA parameter comprises:
 program logic stored in data storage and executable by the at least one processor to:
 if the determined usage level is high and the TCA parameter is greater than a minimum threshold, then adjust the TCA parameter such that expected usage of the traffic-channel resource for the TCA process is reduced;
 if the determined usage level is low and the TCA parameter is less than a maximum threshold, then adjust the TCA parameter such that expected usage of the traffic-channel resource for the TCA process is increased; and
 otherwise, refrain from adjusting the TCA parameter.

19. The system of claim 16, wherein the program logic stored in data storage and executable by the at least one processor to update the one or more TCA parameters comprises:
 program logic stored in data storage and executable by the at least one processor to update at least one of (a) a traffic channel assignment (TCA) count and (b) a traffic channel confirmation (TCC) wait timer.

20. The system of claim 16, wherein the program logic stored in data storage and executable by the at least one processor to determine the usage level of the at least one traffic-channel resource in the coverage area of the access network comprises:
 program logic stored in data storage and executable by the at least one processor to determine at least one of (a) a MAC_ID usage level and (b) an access-channel occupancy (ACO) of a reverse-link access channel in the coverage area.

* * * * *